US010134437B2

(12) United States Patent
Tsuboi et al.

(10) Patent No.: US 10,134,437 B2
(45) Date of Patent: Nov. 20, 2018

(54) INFORMATION MEMORY DEVICE, FAILURE PREDICTING DEVICE AND FAILURE PREDICTING METHOD

(71) Applicant: Kabushiki Kaisha Toshiba, Minato-ku, Tokyo (JP)

(72) Inventors: Takehiko Tsuboi, Yokohama Kanagawa (JP); Kunihiro Shimada, Inagi Tokyo (JP); Takashi Endo, Kawasaki Kanagawa (JP); Takashi Usui, Saitama Saitama (JP); Toshiaki Ohgushi, Yokohama Kanagawa (JP); Takeichiro Nishikawa, Yokohama Kanagawa (JP); Daiki Kiribuchi, Katsushika Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 97 days.

(21) Appl. No.: 15/256,973

(22) Filed: Sep. 6, 2016

(65) Prior Publication Data

US 2017/0263283 A1 Sep. 14, 2017

Related U.S. Application Data

(60) Provisional application No. 62/305,663, filed on Mar. 9, 2016.

(51) Int. Cl.
*G11B 19/04* (2006.01)
*G11B 5/455* (2006.01)

(52) U.S. Cl.
CPC ............ *G11B 19/048* (2013.01); *G11B 5/455* (2013.01); *G11B 19/041* (2013.01)

(58) Field of Classification Search
CPC ....... G11B 5/455; G11B 19/04–19/041; G11B 19/048
USPC ...................... 360/31, 53, 55, 60, 69, 71, 75
See application file for complete search history.

(56) References Cited

U.S. PATENT DOCUMENTS 7,206,151 B2 4/2007 Kimura et al.
7,359,134 B2 4/2008 Komatsu
7,461,298 B2 12/2008 Tan et al.
7,587,631 B2 9/2009 Shimmitsu
7,757,154 B2 * 7/2010 Takemura .............. G11B 20/18 714/769
7,952,826 B2 * 5/2011 Youlian ................ G11B 19/048 360/31
8,169,725 B2 * 5/2012 Jun ........................ G11B 19/04 360/31
8,341,121 B1 12/2012 Claudatos et al.
8,760,780 B1 * 6/2014 Brooker ................. G11B 27/36 360/31
2002/0191319 A1 * 12/2002 Liew .................. G11B 20/1816 360/53

(Continued)

FOREIGN PATENT DOCUMENTS

JP 2007-035217 A 2/2007

*Primary Examiner* — Wayne Young
*Assistant Examiner* — James L Habermehl
(74) *Attorney, Agent, or Firm* — White & Case LLP

(57) ABSTRACT

According to one embodiment, physical position information on errors on a recording medium is acquired, physical position relationship between the errors on the recording medium is calculated based on the position information, and a failure mode related to the errors is determined based on the position relationship.

17 Claims, 15 Drawing Sheets

21
HM HW HR
A
24
22
23
SPM
HEAD AMPLIFIER
25
27
28
26
29
34
MOTOR DRIVER
MOTOR DRIVER
SIGNAL PROCESSING CIRCUIT
CONTROLLER
EXTERNAL DEVICE
33
30
31
32
MCU
MEMORY
PARAMETER INFORMATION COLLECTION UNIT

(56) References Cited

U.S. PATENT DOCUMENTS

| | | | | |
|---|---|---|---|---|
| 2007/0074087 | A1 * | 3/2007 | Lo | G11B 20/18<br>714/710 |
| 2009/0161243 | A1 * | 6/2009 | Sharma | G11B 27/36<br>360/31 |
| 2016/0092292 | A1 * | 3/2016 | Lv | G06F 11/079<br>714/37 |

* cited by examiner

EXTERNAL DEVICE
34
CONTROLLER
29
33
PARAMETER INFORMATION COLLECTION UNIT
32
MEMORY
31
MCU
30
HEAD AMPLIFIER
25
SIGNAL PROCESSING CIRCUIT
26
MOTOR DRIVER
28
MOTOR DRIVER
27
SPM
23
24
A
HM
HW
HR
21
22

22
PE

22
PE

INTER-ERROR AVERAGE DISTANCE
$10^0$
$10^{-1}$
$10^{-2}$
$10^{-3}$
$10^{-4}$
HEAD FAILURE
DISC FAILURE
50
100
150
200
NUMBER OF RECOVERED ERRORS

FREQUENCY OF DISC FAILURE
FREQUENCY OF HEAD FAILURE
HEAD FAILURE
DISC FAILURE
log(MDDBE)
0
-1
-2
-3
-4
0
10
20
30
40
50
0
5
10
15
20

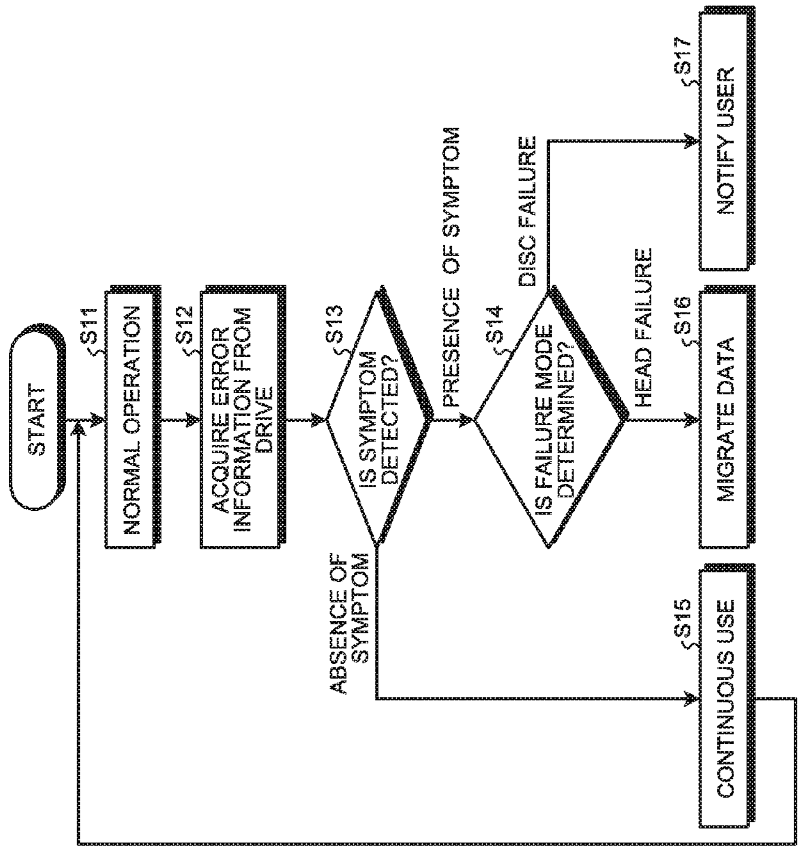
FIG.5B
START
S11
NORMAL OPERATION
S12
ACQUIRE ERROR INFORMATION FROM DRIVE
S13
IS SYMPTOM DETECTED?
PRESENCE OF SYMPTOM
ABSENCE OF SYMPTOM
S14
IS FAILURE MODE DETERMINED?
DISC FAILURE
HEAD FAILURE
S15
CONTINUOUS USE
S16
MIGRATE DATA
S17
NOTIFY USER

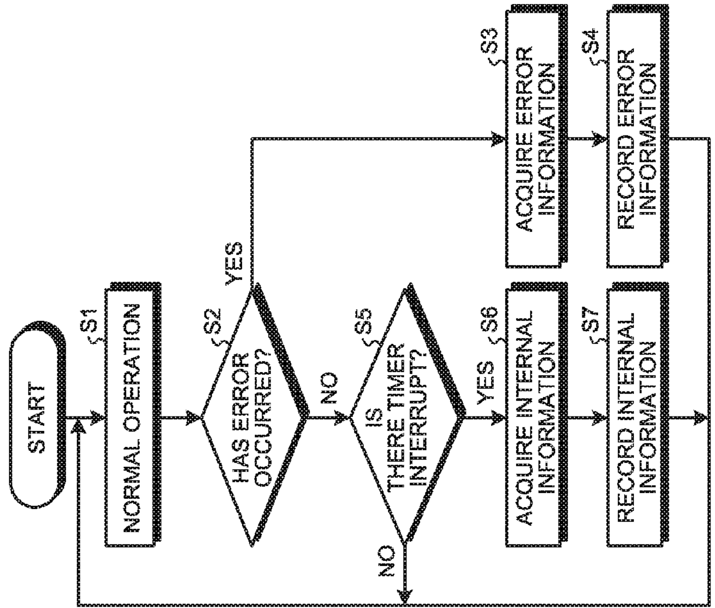
FIG.5A
START
S1
NORMAL OPERATION
S2
HAS ERROR OCCURRED?
YES
NO
S3
ACQUIRE ERROR INFORMATION
S4
RECORD ERROR INFORMATION
S5
IS THERE TIMER INTERRUPT?
YES
NO
S6
ACQUIRE INTERNAL INFORMATION
S7
RECORD INTERNAL INFORMATION START
S21
NORMAL OPERATION
S22
ACQUIRE ERROR INFORMATION FROM DRIVE
S23
IS SYMPTOM DETECTED?
ABSENCE OF SYMPTOM
PRESENCE OF SYMPTOM
S24
IS FAILURE MODE DETERMINED?
READ FAILURE
WRITE FAILURE
S25
CONTINUOUS USE
S26
NOTIFY USER DISABLE WRITING
S27
MIGRATE DATA

INFORMATION MEMORY DEVICE, FAILURE PREDICTING DEVICE AND FAILURE PREDICTING METHOD

CROSS-REFERENCE TO RELATED APPLICATIONS

This application is based upon and claims the benefit of priority from U.S. Provisional Application No. 62/305,663, filed on Mar. 9, 2016; the entire contents of which are incorporated herein by reference.

FIELD

Embodiments described herein relate generally to an information memory device, a failure predicting device, and a failure predicting method.

BACKGROUND

To prevent breakage and loss of data recorded in a magnetic disc device, it is desired to predict a failure of the magnetic disc device. When a failure of the magnetic disc device is predicted, it is desired to conduct immediately parts replacement, data migration, or the like.

BRIEF DESCRIPTION OF THE DRAWINGS

FIG. 5A is a flowchart of operations of a parameter information collection unit illustrated in FIG. 2, and FIG. 5B is a flowchart of operations of a failure predicting device illustrated in FIG. 1;

DETAILED DESCRIPTION

In general, according to one embodiment, information on physical positions of errors on a recording medium is acquired, physical position relationships between the errors on the recording medium are calculated based on the position information, and a failure mode relating to the errors is determined based on the position relationship.

Exemplary embodiments of a magnetic disc device and a failure predicting method will be explained below in detail with reference to the accompanying drawings. The present invention is not limited to the following embodiments.

(First Embodiment)

Figure 1:
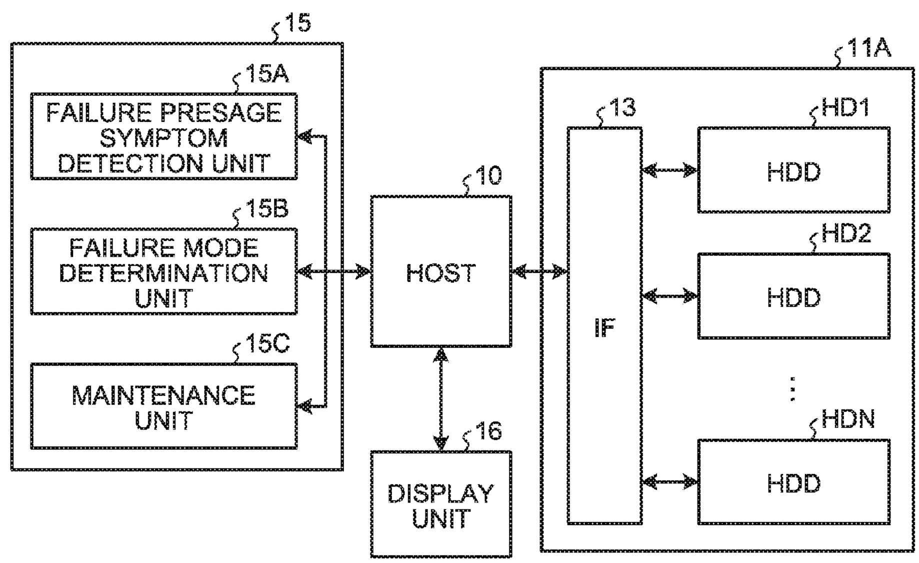
FIG. 1 is a schematic block diagram of a storage system to which a failure predicting method according to a first embodiment is applied.

FIG. 1 is a schematic block diagram of a storage system to which a failure predicting method according to a first embodiment is applied.

Referring to FIG. 1, a storage system 11A is provided with N (N is a positive integer) magnetic disc devices HD1 to HDN. The capacity of the storage system 11A can be set in terabyte order, for example. The storage system 11A can be used as a data center, for example.

Figure 2:
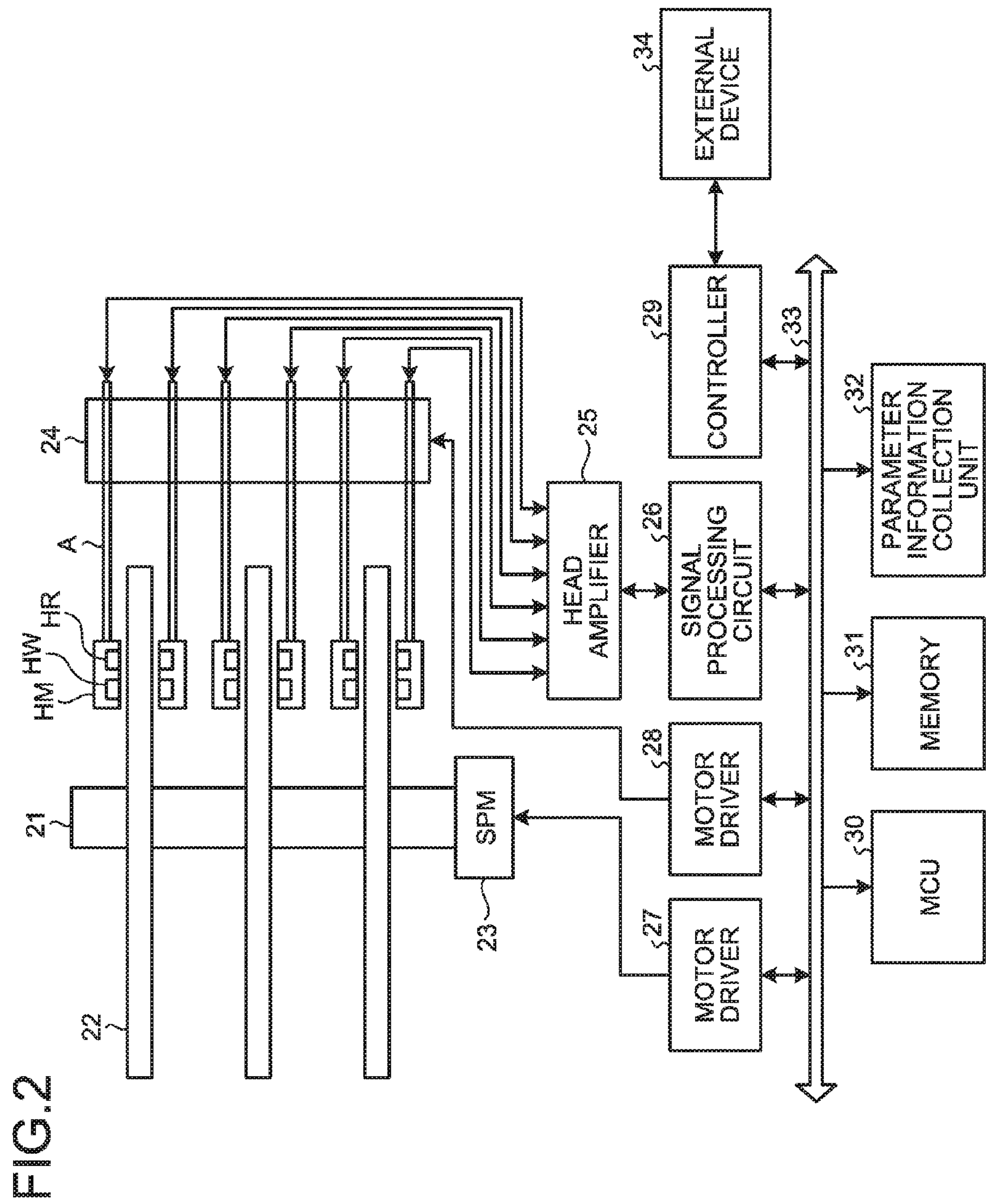
FIG. 2 is a schematic block diagram of a magnetic disc device for use in the storage system illustrated in FIG. 1.

FIG. 2 is a schematic block diagram of a magnetic disc device for use in the storage system illustrated in FIG. 1.

Referring to FIG. 2, a magnetic disc device HDD includes a magnetic disc 22 that is supported via a spindle 21. The magnetic disc device HDD also includes a head slider HM. The head slider HM includes a write head HW and a read head HR as magnetic heads. The write head HW and the read head HR are opposed to the magnetic disc 22.

FIG. 2 illustrates the case where the three magnetic discs 22 are provided with six recording surfaces because their both sides are to be recorded. The magnetic heads can be provided for the respective recording surfaces. The head slider HM is held on the magnetic disc 22 via an arm A. The arm A can slide the head slider HM on a horizontal plane at seek time or the like.

The magnetic disc device HDD also includes a voice coil motor 24 driving the arm A and a spindle motor 23 rotating the magnetic disc 22.

The write head HW and the read head HR are connected to a signal processing circuit 26 via a head amplifier 25.

The magnetic disc device HDD also includes motor drivers 27 and 28, a controller 29, a micro controller unit (MCU) 30, a memory 31, and a parameter information collection unit 32. The signal processing circuit 26, the motor drivers 27 and 28, the controller 29, the MCU 30, the memory 31, and the parameter information collection unit 32 can be connected together via a bus 33. The controller 29 is connected to an external device 34. The external device 34 may be a host computer or an external interface.

The head amplifier 25 can amplify write current flowing in the write head HW and amplify a reproduction signal read by the read head HR. The signal processing circuit 26 can convert a signal reproduced by the read head HR into a data format capable of being handled by a host 10, and convert data output from the host 10 into a signal format capable of being recorded by the write head HW. The motor driver 27 can drive the spindle motor 23. The motor driver 28 can drive the voice coil motor 24.

The controller 29 can control an interface with the external device 34. The MCU 30 can perform an overall control of the magnetic disc device HDD. The memory 31 can hold data necessary for control of the magnetic disc device HDD, and can be used as a write buffer or a read buffer. The parameter information collection unit 32 can collect parameter information and error information related to writing or reading of the magnetic disc device HDD. The error information can be the number of errors, error rate, and error position information, and the parameter information can be the number of retries, retry rate, signal quality value, head lift amount, and the like, for example.

Referring to FIG. 1, the storage system 11A is connected to the host 10 via an interface 13. The host 10 is connected to a failure predicting device 15 and a display unit 16. The failure predicting device 15 can predict failure modes of the magnetic disc devices HD1 to HDN. The failure modes can be predicted by the use of information related to the physical position relationship between errors on the magnetic disc 22. The errors may be read errors or write errors. The failure predicting device 15 can determine a disc failure and a head failure as failure modes of the magnetic disc devices HD1 to HDN. The failure modes can be determined by the use of parameters related to the physical distance between the errors on the magnetic disc 22.

Alternatively, the failure predicting device 15 may determine a write failure and a read failure as failure modes of the magnetic disc devices HD1 to HDN. The failure modes can be determined by the use of parameters related to the radial magnitudes of the errors on the magnetic disc 22.

The failure predicting device 15 includes a failure presage symptom detection unit 15A, a failure mode determination unit 15B, and a maintenance unit 15C. The failure presage symptom detection unit 15A can detect failure symptoms in the magnetic disc devices HD1 to HDN. The failure mode determination unit 15B can determine failure modes related to errors on the magnetic disc 22 based on the physical position relationship between the errors.

The failure mode determination unit 15B can determine a disc failure and a head failure based on a parameter related to the physical distance between the errors on the magnetic disc 22. The parameter related to the physical distance between the errors can indicate locality or dispersibility of error distribution on the magnetic disc 22. The parameter related to the physical distance between the errors can be used for the determination on the failure modes to convert the failure modes into numeric values and allow a computer to determine the failure modes. The maintenance unit 15C can perform a data maintenance process according to the failure modes of the magnetic disc devices HD1 to HDN.

Figure 3B:
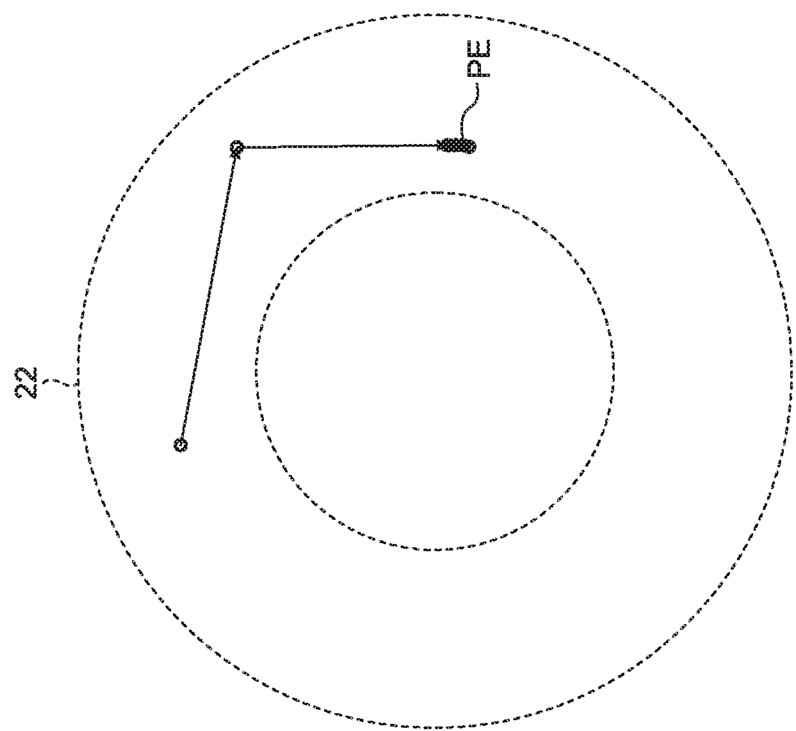
FIGS. 3A and 3B are diagrams illustrating examples of error distribution on magnetic discs to which the failure predicting method according to the first embodiment is applied.
Figure 3A:
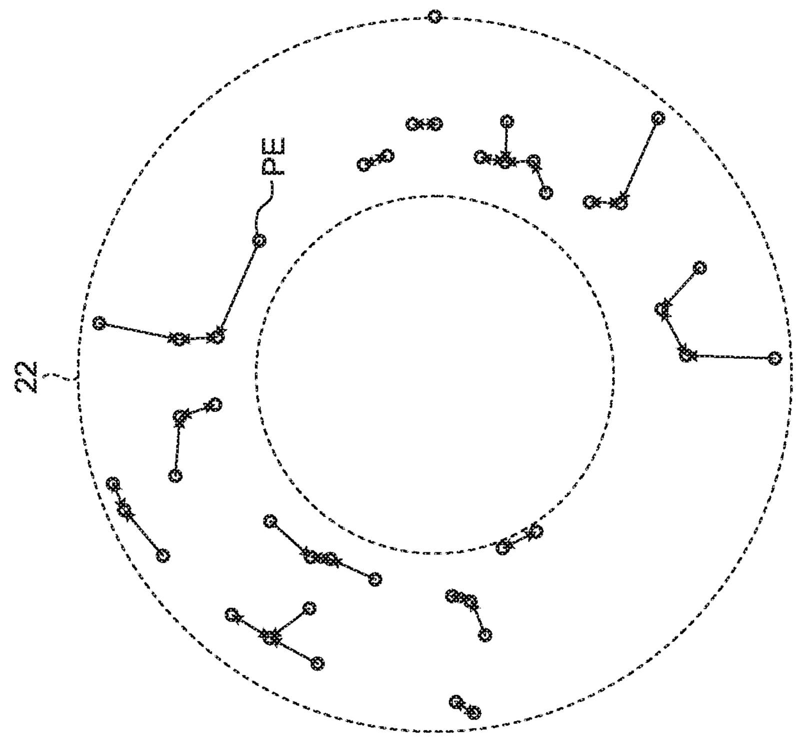

FIGS. 3A and 3B are diagrams illustrating an example of error distribution on magnetic discs to which the failure predicting method according to the first embodiment is applied.

Referring to FIG. 3A, errors PE are dispersed on the magnetic disc 22. The dispersion of the errors PE occurs because the magnetic head moves to arbitrary positions on the magnetic disc 22. Accordingly, it can be determined that there is a head failure in the presence of dispersion of the errors PE.

Meanwhile, referring to FIG. 3B, the errors PE are localized on the magnetic disc 22. The localization of the errors PE can correspond to a local flaw on the magnetic disc 22. Accordingly, it can be determined that there is a disc failure in the presence of localization of the errors PE.

As a parameter for a physical distance between errors, a dispersive power D can be used. Using the dispersive power D facilitates determination on locality or dispersibility of error distribution on the magnetic disc 22. The dispersive power D can be given by the following equation from an inter-error average distance W and an expected value We of the inter-error average distance:

$$D=W/W_e$$

where $$W=\frac{1}{n}\sum_{i=1}^{n}d_i$$

$$W_e=\frac{1}{2\sqrt{n/S}}$$

S: Area of error distribution $d_i$: Distance from error i to the closest adjacent error n: Number of errors.

At that time, it can be said that errors PE are localized as the dispersive power D is smaller than 1, and the errors PE are dispersed as the dispersive power D is closer to 1. The dispersive power D can reflect error spatial distribution characteristics and improve the accuracy of determination on disc failures.

Figure 4A:
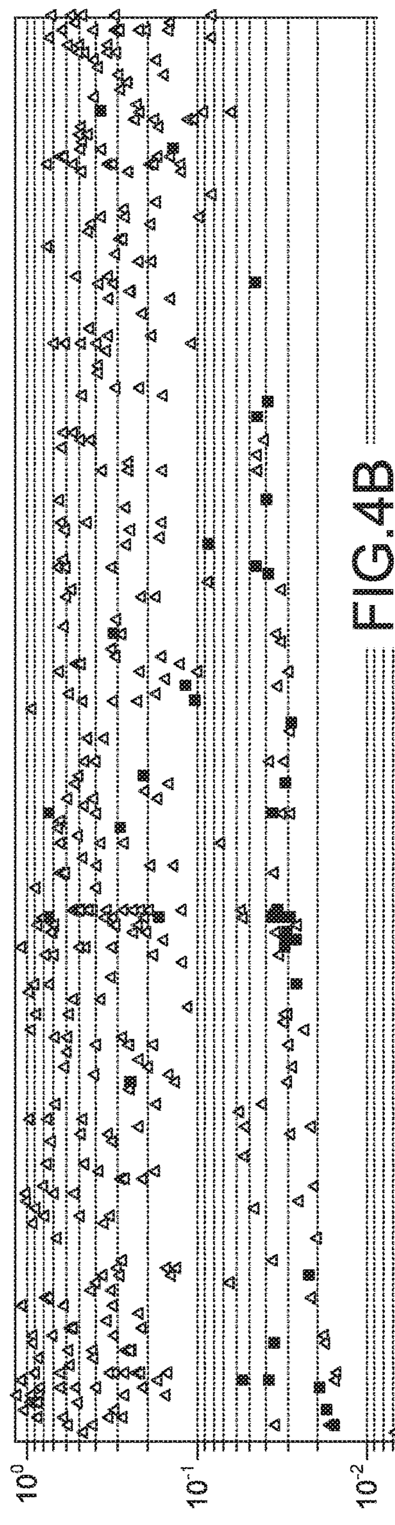
FIG. 4A is a diagram illustrating the relationship between the number of errors with head failures and disc failures and inter-error average distances.
Figure 4B:
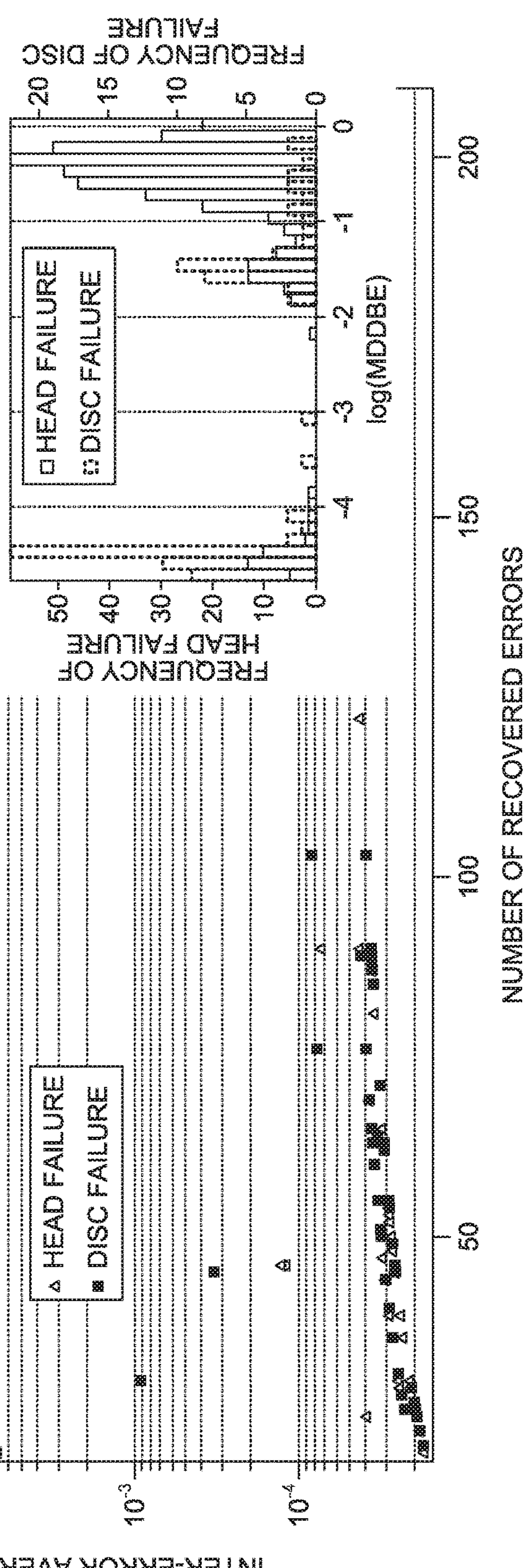
FIG. 4B is a histogram illustrating the relationship between inter-error average distances with head failures and disc failures and the frequency of failures.

FIG. 4A is a diagram illustrating the relationship between the number of errors (the number of recovered errors) with head failures and disc failures and inter-error average distances, and FIG. 4B is a histogram illustrating the relationship between inter-error average distances with head failures and disc failures and the frequency of failures. The inter-error average distances are expressed by MDDBE.

Referring to FIGS. 4A and 4B, head failure groups and disc failure groups are clearly separated by the inter-error average distances. The head failure groups and the disc failure groups can be separated at a stage with relatively fewer errors.

By discriminating between head failures or disc failures at the time of failure prediction in the magnetic disc devices HD1 to HDN, it is possible to determine early whether reading or writing is disabled on the entire magnetic disc 22 or whether reading or writing is normally enabled on the magnetic disc 22 except for local regions. This makes it possible to prevent wide-range breakage of data while preventing excessive replacements of the magnetic disc devices HD1 to HDN, and improve the reliability of the magnetic disc devices HD1 to HDN while suppressing cost increase.

Overall operations of the failure predicting device 15 illustrated in FIG. 1 will be explained below.

FIG. 5A is a flowchart of operations of the parameter information collection unit illustrated in FIG. 2, and FIG. 5B is a flowchart of operations of the failure predicting device illustrated in FIG. 1.

Referring to FIG. 5A, when the magnetic disc device HDD is normally operating (S1), it is determined whether any error has occurred (S2). When some error has occurred, the parameter information collection unit 32 acquires error information (S3), and records the error information (S4). Even though no error has occurred (S2), when an internal timer interrupt (S5) arises, the parameter information collection unit 32 acquires internal information in the magnetic disc device HDD (S6), and records the internal information (S7).

Meanwhile, referring to FIG. 5B, when the magnetic disc device HDD is normally operating (S11), the failure predicting device 15 acquires the error information and the internal information from the parameter information collection unit 32 (S12). Then, the failure presage symptom detection unit 15A detects the presence or absence of a failure symptom based on measurement values of the number of errors, error rate, error position information, the number of retries, retry rate, signal quality value, and head lift amount (S13). For example, the failure presage symptom detection unit 15A uses any of the measurement values or one or more of the measurement values to calculate an evaluation value. When the evaluation value exceeds a predetermined threshold, it can be determined that there is a failure symptom. When no failure symptom is detected, the magnetic disc device HDD will be continuously used (S15).

Meanwhile, when the failure presage symptom detection unit 15A detects a failure symptom, the failure mode determination unit 15B determines a failure mode for the failure symptom (S14). The failure mode determination unit 15B acquires parameter information and error information held in the magnetic disc device HDD at a predetermined timing. The errors here mean reading errors of magnetic data that include recoverable errors and replacement source errors that are recovered by sector replacements. The failure mode determination unit 15B can determine whether the failure mode for the failure symptom is a disc failure or a head failure based on a parameter having a predetermined threshold related to error spatial continuity.

When the failure mode is determined as a head failure, the maintenance unit 15C maintains data read by the read head HR (S16). The data read by the read head HR refers to data recorded on a disc surface corresponding to the read head HR. The maintenance unit 15C can copy the data read by the read head HR determined as having the symptom of the head failure to another disc surface. The other disc surface is one of the disc surfaces (six surfaces in the example of FIG. 2) included in the magnetic disc device HDD from which data is read by a read head HR other than the read head HR determined as having the symptom of the head failure.

The other disc surface may be the disc surface opposite to the disc surface on which the read head HR determined as having the symptom of the head failure is provided, or may be a disc surface of a magnetic disc 22 different from the magnetic disc 22 on which the read head HR determined as having the symptom of the head failure is provided, or may be a disc surface included in a magnetic disc device different from the magnetic disc device including the read head HR determined as having the symptom of the head failure. In addition, the other disc surface is preferably a disc surface on which the read head HR is in a favorable state.

The disc surface on which the read head HR is in the favorable state may be a disc surface corresponding to a read head HR determined as having no failure symptom or a disc surface on which the number of errors is equal to or smaller than a predetermined value. Further, the other disc surface is preferably a disc surface with a low error rate. The maintenance unit 15C can collect the error rates of the disc surfaces from the magnetic disc device and select a disc surface with a low error rate based on the collected error rates.

When the failure mode is determined as a disc failure, the maintenance unit 15C can decide a region with a high possibility of the disc failure based on address information related to the error, and notify the host 10 that no data is to be newly recorded in that region. In addition, the maintenance unit 15C may notify the user of the presence or absence of the failure symptom and provide the information on the failure mode to the user (S17). The method of data maintenance by the maintenance unit 15C is not limited to the foregoing one. For example, the maintenance unit 15C may store a plurality of maintenance methods in a look-up table or the like and select a maintenance method to be used depending on the ID of the head in which a symptom is detected, the evaluation vales of the heads, or the like.

Figure 6:
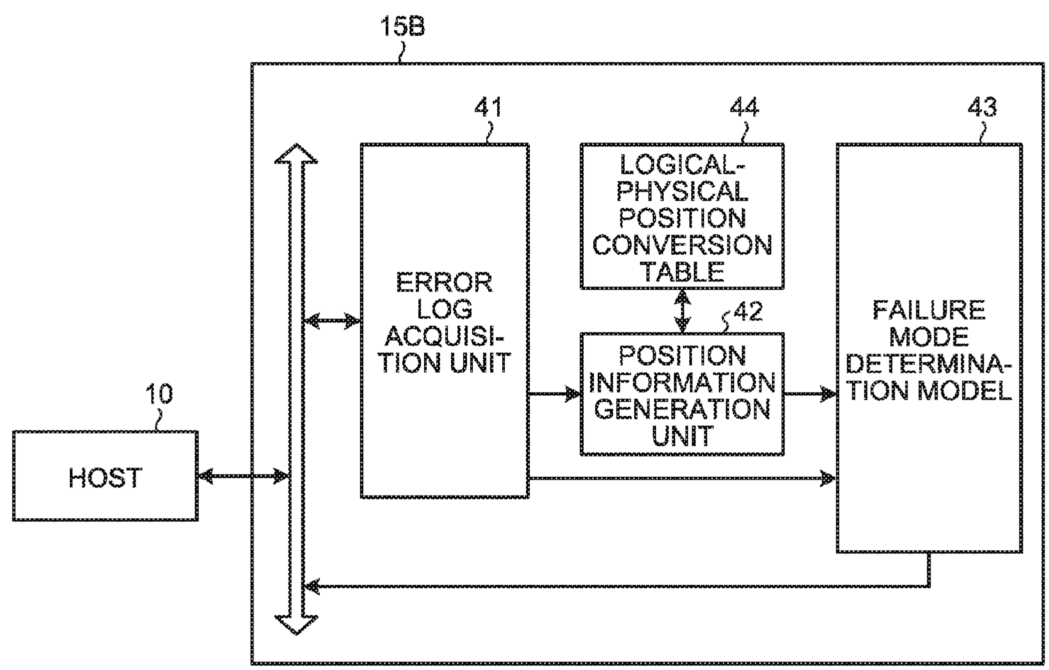
FIG. 6 is a block diagram of a configuration example of a failure mode determination unit illustrated in FIG. 1.

FIG. 6 is a block diagram of a configuration example of the failure mode determination unit illustrated in FIG. 1.

Referring to FIG. 6, the failure mode determination unit 15B includes an error log acquisition unit 41, a position information generation unit 42, a failure mode determination model 43, and a physical position conversion table 44. The error log acquisition unit 41 can acquire an error log via the host 10. The position information generation unit 42 can generate physical position information on errors on the magnetic disc 22. The physical position conversion table 44 can hold the correspondence relationship between logical addresses and physical position information on the magnetic disc.

The failure mode determination model 43 can build a regression model with a parameter related to the error position information as an explanatory variable. In the case of determining on a head failure or a disc failure, the failure mode determination model 43 may build a multivariate logistic regression model with parameters related to the number of errors and a physical distance between the errors as explanatory variables.

The error log acquisition unit 41 acquires an error log from the parameter information collection unit 32. The error log can include logical addresses of errors. The error log may record write errors and read errors separately, but the write errors and read errors in the error log are called collectively errors. The position information generation unit 42 refers to a logical-physical address conversion table 44 to convert the logical addresses of the errors to physical addresses. The failure mode determination model 43 generates a parameter related to the physical distance between the errors based on the physical addresses of the errors, and determines the failure mode from the parameter.

In the case of using a multivariate logistic regression model to determine the failure mode, the following equation (1) can be used:

$$p=1/(1+\exp(-(\beta_O+\beta_1 x_1+ \ldots +\beta_n x_n))) \quad (1)$$

where p represents model output, x explanatory variable, and β a coefficient of the explanatory variable. To determine on a head failure or a disc failure, the explanatory variable x can be a parameter for the number of errors (for example, the number of recovered errors), the number of reproduced sectors, or the physical distance between the errors.

The parameter related to the physical distance between the errors can be selected from among the dispersive power, the average value of two-dimensional distances between the errors, the median value of two-dimensional distances between the errors, the average value of one-dimensional distances between the errors, and the median value of one-dimensional distances between the errors. The average value of two-dimensional distances and the median value of two-dimensional distances can express a two-dimensional spatial distance.

By using the two-dimensional spatial distance, it is possible to determine the proximity between the errors with high accuracy and determine the locality or dispersibility of the errors with high accuracy. The average value of one-dimensional distances and the median value of one-dimensional distances can express a cylinder distance. By using the cylinder distance, it is possible to reduce a burden of calculation as compared to the case of using the two-dimensional spatial distance.

It is possible to determine whether the failure mode is a disc failure or a head failure by the magnitude relationship between the model output p and a predetermined threshold. For example, the failure mode is more likely to be a disc failure as the model output p is closer to 1, and the failure mode is more likely to be a head failure as the model output p is closer to 0.

Figure 7:
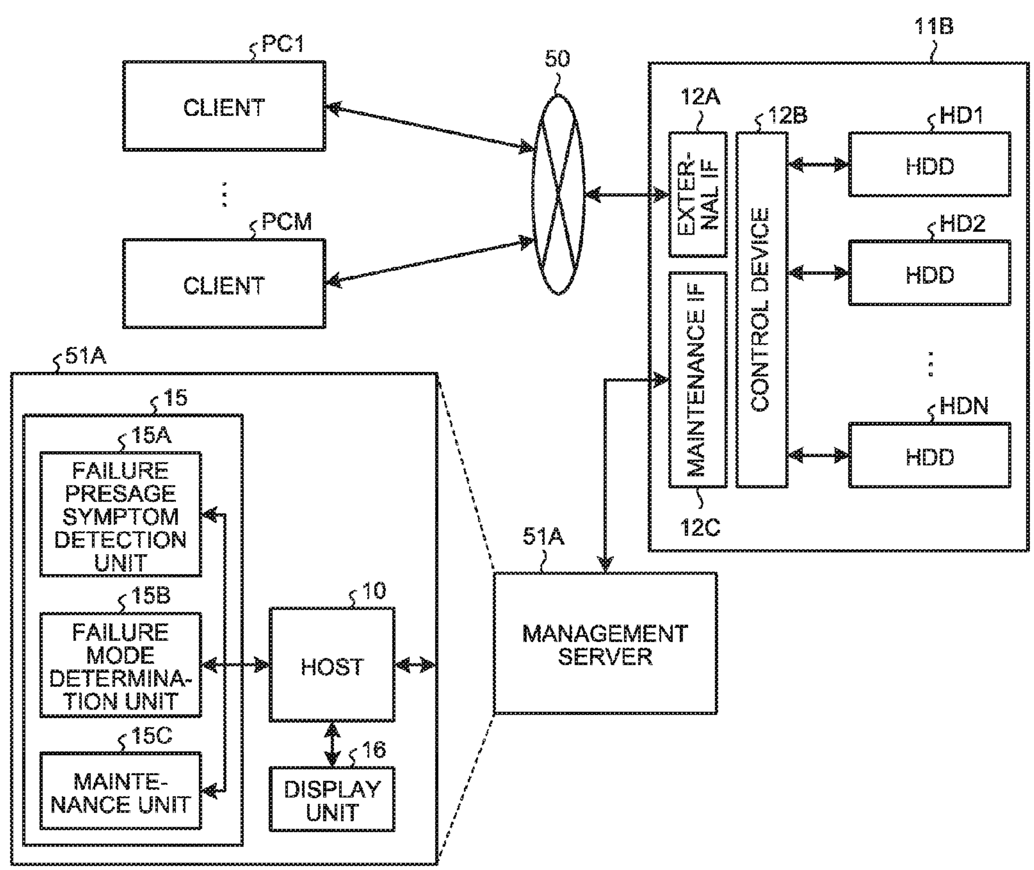
FIG. 7 is a block diagram illustrating another example of storage system to which the failure predicting method according to the first embodiment is applied.

FIG. 7 is a block diagram illustrating another example of storage system to which the failure predicting method according to the first embodiment is applied.

FIG. 1 illustrates an example in which the failure predicting device 15 is independently configured. Alternatively, the failure predicting device 15 may be built in the server.

Specifically, referring to FIG. 7, a storage system 11B includes N magnetic disc devices HD1 to HDN, an external interface 12A, a control device 12B, and a maintenance interface 12C. The control device 12B can connect the magnetic disc devices HD1 to HDN to the external interface 12A or the maintenance interface 12C. The external interface 12A is connected to M (M is a positive integer) clients PC1 to PCM via an external network 50. The maintenance interface 12C is connected to a management server 51A. The management server can connect the maintenance interface 12C in one or more storage systems 11B. The management server 51A includes a host 10, a failure predicting device 15, and the display unit 16.

The failure predicting device 15 can access the magnetic disc devices HD1 to HDN via the maintenance interface 12C to reduce a burden on the external network 50.

Figure 8:
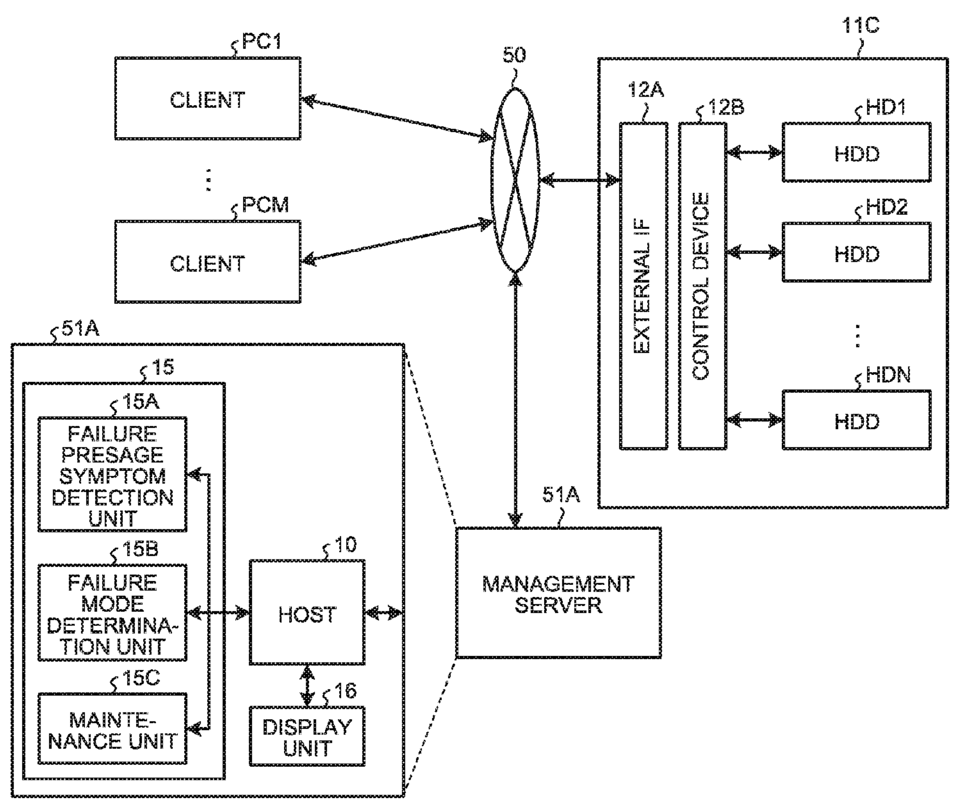
FIG. 8 is a block diagram illustrating still another example of storage system to which the failure predicting method according to the first embodiment is applied.

FIG. 8 is a block diagram illustrating still another example of storage system to which the failure predicting method according to the first embodiment is applied.

FIG. 7 illustrates an example in which the failure predicting device 15 accesses the magnetic disc devices HD1 to HDN not using the external network 50. Alternatively, the failure predicting device 15 may access the magnetic disc devices HD1 to HDN via the external network 50.

Specifically, referring to FIG. 8, a storage system 11C includes N magnetic disc devices HD1 to HDN, an external interface 12A, and a control device 12B. The control device 12B can connect the magnetic disc devices HD1 to HDN to the external interface 12A. The external interface 12A is connected to clients PC1 to PCM and a management server 51A via an external network 50. The management server 51A includes a host 10, a failure predicting device 15, and a display unit 16.

The failure predicting device 15 can access the magnetic disc devices HD1 to HDN via the external network 50. This eliminates the need to provide the maintenance interface 12C in the storage system 11C, thereby simplifying the configuration as compared to the storage system 11B illustrated in FIG. 7.

Figure 9:
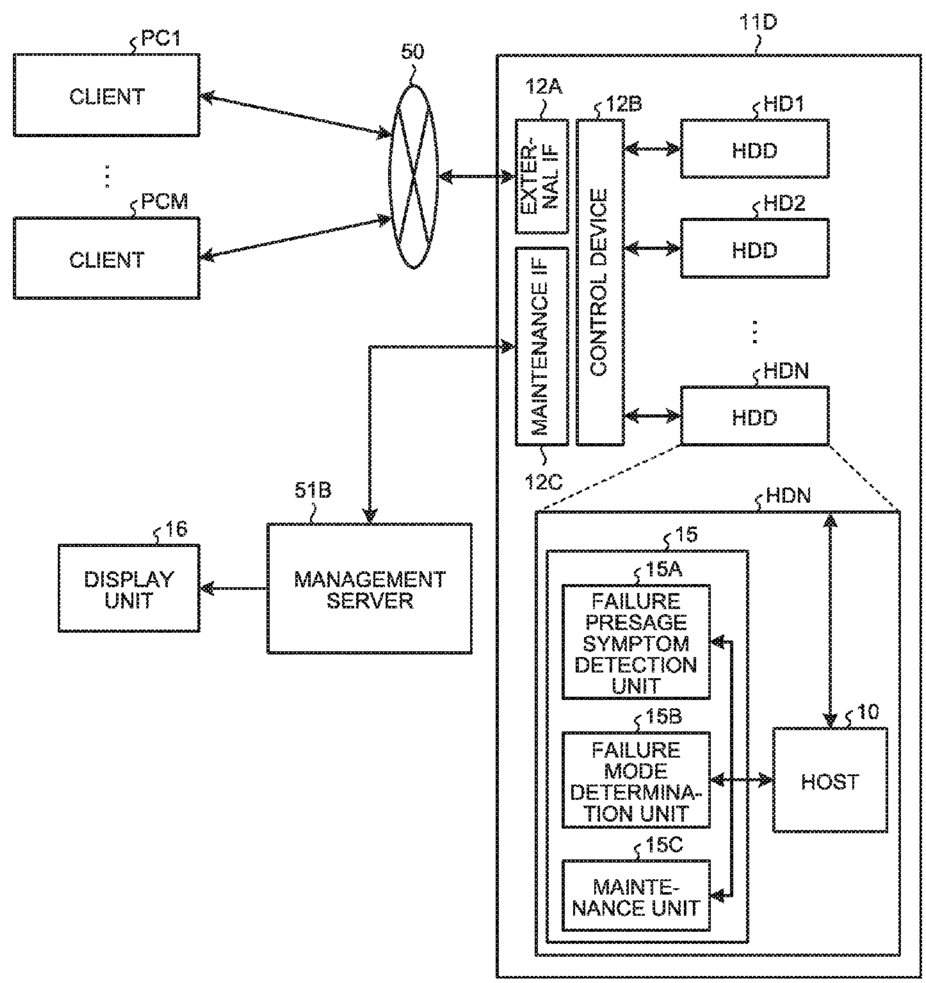
FIG. 9 is a block diagram illustrating still another example of storage system to which the failure predicting method according to the first embodiment is applied.

FIG. 9 is a block diagram illustrating still another example of storage system to which the failure predicting method according to the first embodiment is applied.

FIGS. 7 and 8 illustrate an example in which the failure predicting device 15 is provided outside the magnetic disc devices HD1 to HDN. Alternatively, the failure predicting devices 15 may be provided in the magnetic disc devices HD1 to HDN.

Specifically, referring to FIG. 9, a storage system 11D includes N magnetic disc devices HD1 to HDN, an external interface 12A, a control device 12B, and a maintenance interface 12C. The magnetic disc devices HD1 to HDN include a failure predicting device 15 and a host 10. The control device 12B can connect the magnetic disc devices HD1 to HDN to the external interface 12A or the maintenance interface 12C. The external interface 12A is connected to clients PC1 to PCM via an external network 50. The maintenance interface 12C is connected to a management server 51B. The management server 51B is connected to a display unit 16.

By providing the failure predicting devices 15 in the magnetic disc devices HD1 to HDN, the magnetic disc devices HD1 to HDN can use the failure predicting devices 15 exclusively, thereby reducing a burden on the failure predicting device 15.

Figure 10:
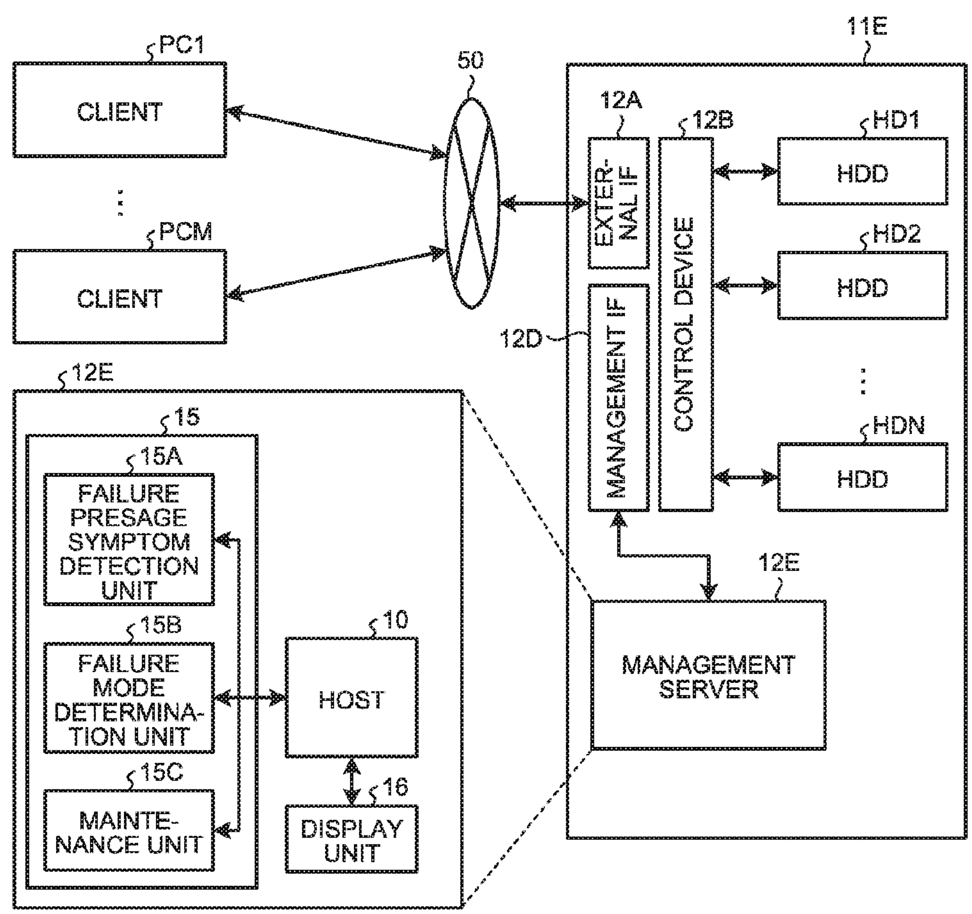
FIG. 10 is a block diagram illustrating still another example of storage system to which the failure predicting method according to the first embodiment is applied.

FIG. 10 is a block diagram illustrating still another example of storage system to which the failure predicting method according to the first embodiment is applied.

FIG. 9 illustrates an example in which the failure predicting devices 15 are provided in the magnetic disc devices HD1 to HDN. Alternatively, the failure predicting device 15 may be provided in a storage system 11E.

Specifically, referring to FIG. 10, the storage system 11E includes N magnetic disc devices HD1 to HDN, an external interface 12A, a control device 12B, a management interface 12D, and a management node 12E. The control device 12B can connect the magnetic disc devices HD1 to HDN to the external interface 12A or the management interface 12D. The external interface 12A is connected to M clients PC1 to PCM via an external network 50.

The management interface 12D is connected to the management server 12E. The management server 12E includes a host 10, a failure predicting device 15, and a display unit 16. The management server 12E may be connected to a plurality of storage systems 11E through the management interface 12D. In this case, the plurality of storage systems 11E connected by the management interface 12D merely needs to include a storage system 11E having at least one or more management server 12E. The storage systems without the management system 12E may be combined.

The failure predicting device 15 can access the magnetic disc devices HD1 to HDN via the management interface 12D to reduce a burden on the external network 50.

In relation to the foregoing embodiment, the method of determining whether the failure mode is a head failure or a disc failure. Alternatively, the embodiment may be applied to the method of determining whether the failure mode is a head failure or a medium failure. In addition, in the foregoing embodiment, the recording media are magnetic discs as an example. Alternatively, the recording media may be magneto-optical discs or phase-change optical discs.

(Second Embodiment)

Figure 11C:
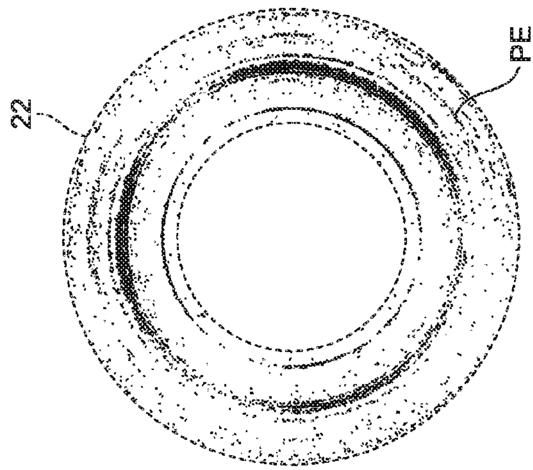
FIGS. 11A to 11C are diagrams illustrating examples of error distribution on magnetic discs to which a failure predicting method according to a second embodiment is applied.
Figure 11B:
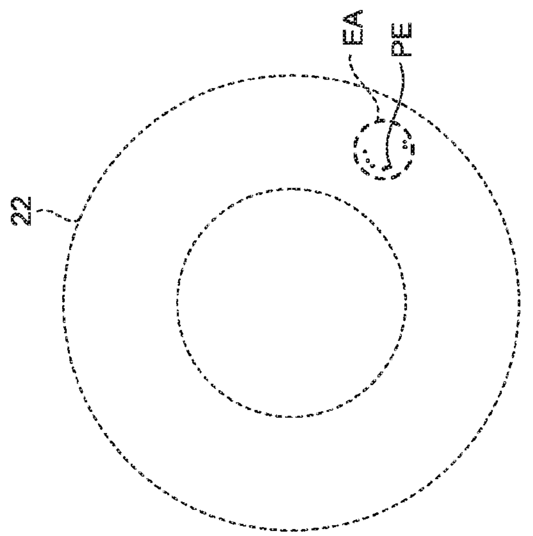
Figure 11A:
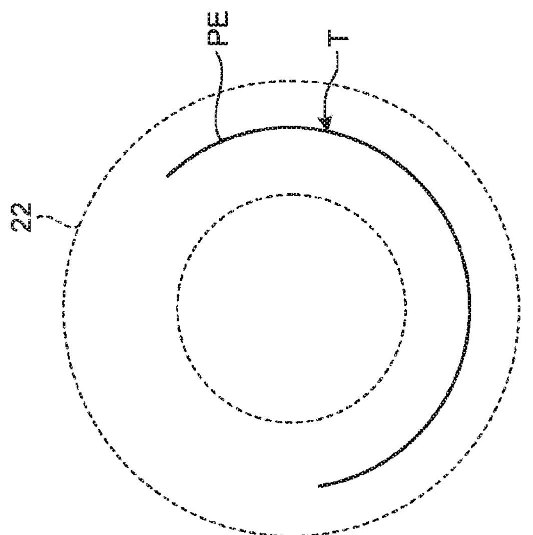

FIGS. 11A to 11C are diagrams illustrating examples of error distribution on magnetic discs to which a failure predicting method according to a second embodiment is applied.

Referring to FIG. 11A, an error PE occurs continuously on the magnetic disc 22 only in a circumferential direction in one track T. When the error PE occurs continuously only in the circumferential direction in the track T, the trajectory of the error PE can correspond to the trajectory of the write head HW at the time of writing. Accordingly, when the error PE occurs continuously only in the circumferential direction in the track T, the failure mode can be determined as a write failure.

Meanwhile, referring to FIG. 11B, the errors PE exist locally in a region EA on the magnetic disc 22. However, the errors PE illustrated in FIG. 11B exist over a plurality of tracks T. The localization of the errors PE can correspond to local flaws on the magnetic disc 22. Accordingly, when the errors PE exist locally in the region EA over a plurality of tracks T, the failure mode can be determined as a disc failure.

Meanwhile, referring to FIG. 11C, the errors PE disperse in a wide range on the magnetic disc 22. The dispersion of the errors PE occurs because the magnetic head moves to arbitrary positions on the magnetic disc 22. In this case, a disc failure instead of a head failure, or both failures may have occurred in a wide range. In such a case, the entire surface of the magnetic disc 22 cannot be used because of the dispersion of the errors PE, and the range of the failure on the magnetic disc 22 is the same as that of a head failure. Accordingly, when there is dispersion of the errors PE, the failure mode can be determined as a head failure.

Figure 12:
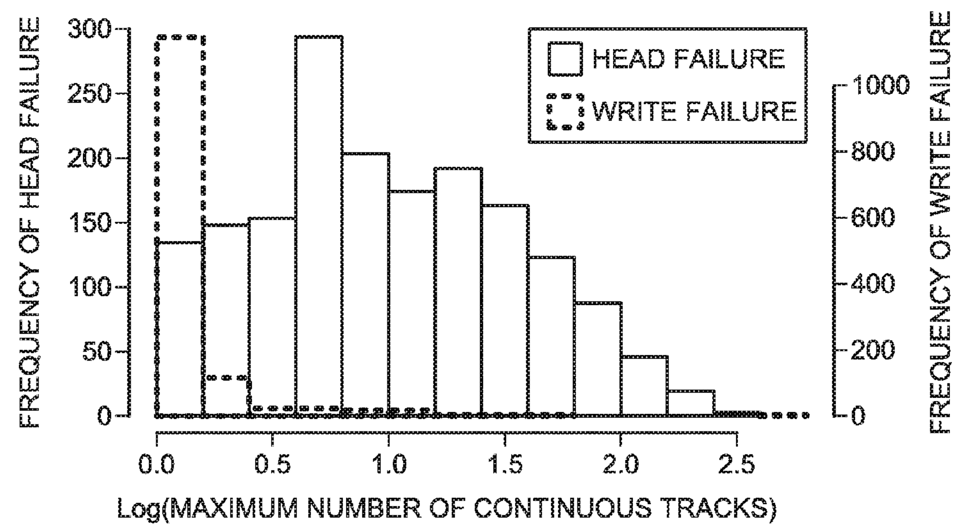
FIG. 12 is a histogram illustrating the relationship between the maximum number of continuous tracks with head failures and write failures and the frequency of failures.

FIG. 12 is a histogram illustrating the relationship between the maximum number of continuous tracks with head failures and write failures and the frequency of failures. The head failure groups correspond to errors having occurred at the time of reading (also called read failures), and the write failure groups correspond to errors having occurred at the time of writing (also called write failures). The read failure groups can also be called errors having occurred due to trouble related to the read head HR illustrated in FIG. 2, and the write failure groups can also be called errors having occurred due to trouble related to the write head HW.

Referring to FIG. 12, the write failure groups have the errors PE having occurred continuously in the track T in the circumferential direction. The head failure groups have the errors PE having occurred over a plurality of tracks T. Accordingly, the head failure groups and the write failure groups can be clearly separated by the maximum number of continuous tracks in which the errors PE have occurred.

By determining at the time of failure prediction in the magnetic disc devices HD1 to HDN whether the predicted failures are write failures or read failures, it is possible to detect early the state in which the magnetic disc 22 can be read but cannot be written. Accordingly, it is possible to enable reading from the magnetic disc 22 while disabling writing into the magnetic disc 22 to prevent wide-range breakage of data while preventing excessive replacements of the magnetic disc devices HD1 to HDN, thereby improving reliability of the magnetic disc devices HD1 to HDN while suppressing cost increase.

Figure 13:
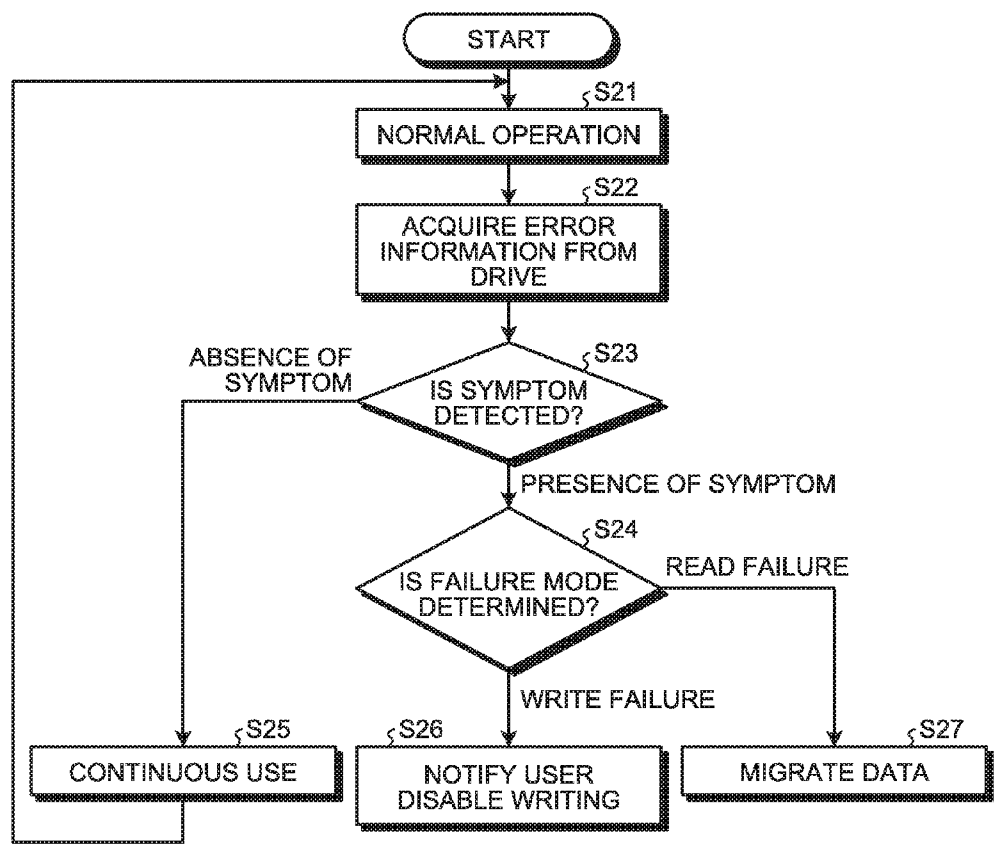
FIG. 13 is a flowchart of operations of a failure predicting apparatus to which the failure predicting method according to the second embodiment is applied.

FIG. 13 is a flowchart of operations of a failure predicting apparatus to which the failure predicting method according to the second embodiment is applied.

Referring to FIG. 13, when the magnetic disc device HDD is normally operating (S21), the failure predicting device 15 acquires error information from the parameter information collection unit 32 (S22). Then, the failure presage symptom detection unit 15A detects the presence or absence of a failure symptom based on measurement values of the number of errors, error rate, error position information, the number of retries, retry rate, signal quality value, and head lift amount (S23). When no failure symptom is detected, the magnetic disc device HDD will be continuously used (S25).

Meanwhile, when the failure presage symptom detection unit 15A detects a failure symptom, the failure mode determination unit 15B determines a failure mode for the failure symptom (S24). The failure mode determination unit 15B can determine whether the failure mode for the failure symptom is a write failure or a read failure based on a parameter having a predetermined threshold related to the magnitudes in the radial direction in which the errors exist. The parameter related to the radial magnitudes of the errors may be the total number of tracks with all the errors having occurred in the magnetic disc device HDD, the total number of track numbers without duplication of the errors, or the like, for example.

Alternatively, the parameter may be a standard deviation of track positions with the errors in the radial direction, the total sum of inter-track distances, or the like. Still alternatively, the parameter may be the maximum number of continuous tracks (the maximum values of number of continuous tracks with all the errors having occurred in the magnetic disc device HDD).

When it is determined that the failure mode is a write failure, the maintenance unit 15C disables subsequent writing into the disc surface determined as having a write failure to suppress occurrence of errors (S26). In addition, since it is considered that no read failure has occurred, the maintenance unit 15C may migrate the data stored in the disc surface by a normal reading operation. Further, after the data migration, the maintenance unit 15C may attempt writing again to determine whether the write error is temporary and local. In addition, the maintenance unit 15C may notify the user of the presence or absence of the failure symptom and provide the information on the failure mode to the user.

When the failure mode is determined as a read failure, the maintenance unit 15C may determine on the data migration or the continuous use of the magnetic disc device by the number of read errors or the like (S27). In the case of a read failure, the data may not be read. Accordingly, the data recorded in advance in another magnetic disc device HDD may be further copied to another place for maintenance. In addition, the data may be maintained by the same method as that in the first embodiment.

Figure 14:
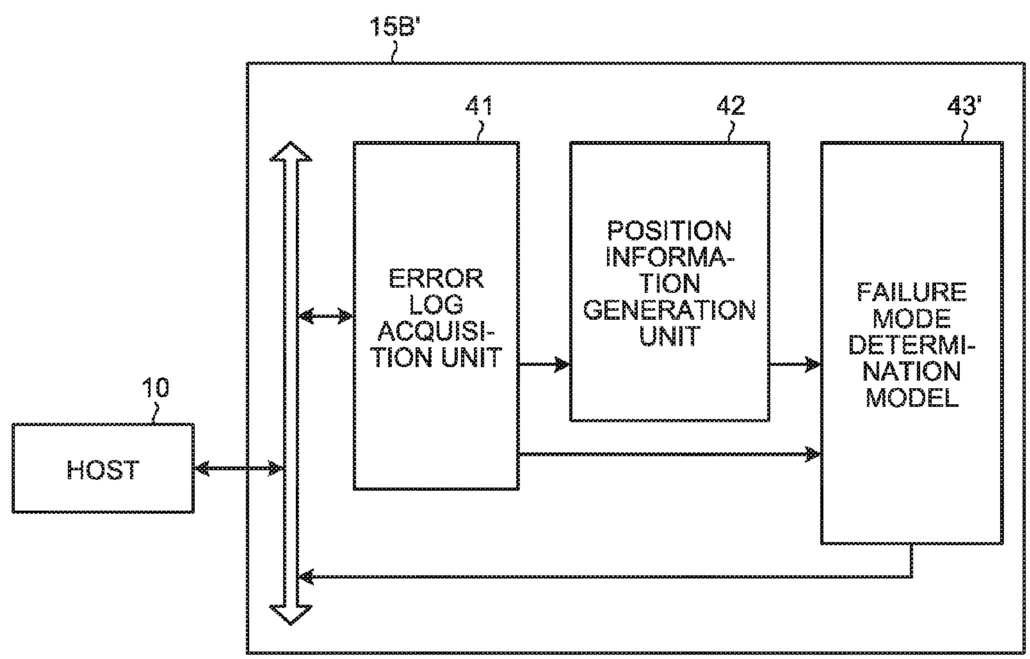
FIG. 14 is a block diagram illustrating a configuration example of a failure mode determination unit to which the failure predicting method according to the second embodiment is applied.

FIG. 14 is a block diagram illustrating a configuration example of a failure mode determination unit to which the failure predicting method according to the second embodiment is applied.

Referring to FIG. 14, in the second embodiment, a failure mode determination unit 15B' can be provided instead of the failure mode determination unit 15B. The failure mode determination unit 15B' includes an error log acquisition unit 41, a position information generation unit 42', and a failure mode determination model 43'. The error log acquisition unit 41 can acquire an error log via the host 10.

The position information generation unit 42' can generate physical position information on errors on the magnetic disc 22. The failure mode determination model 43' can build a regression model with a parameter related to the error position information as an explanatory variable. In the case of determining on a write failure or a read failure, the failure mode determination model 43' may build a multivariate logistic regression model with a parameter related to the number of tracks, the number of errors, the number of retries, or the like as explanatory variable.

The error log acquisition unit 41 acquires an error log from the parameter information collection unit 32. The error log can include logical addresses of errors. The position information generation unit 42' generates the track positions of the errors from the logical addresses of the errors. The failure mode determination model 43' generates a parameter related to the radial magnitudes of the errors based on the track positions of the errors, and determines the failure mode from the parameter.

In the case of using a multivariate logistic regression model to determine the failure mode, the equation (1) can be used. To determine whether the failure mode is a write failure or a read failure, the explanatory variable x can be the total number of tracks, the number of errors, or the like. Alternatively, the explanatory variable x may be the maximum number of continuous tracks with the errors, the number of times when a replacement process has been started in the internal information log, the dispersion of track positions with all the errors in the error information log, the number of hardware errors recorded in the error information log, the number of write retries in the internal information log, the number of write errors recorded in the error information log, the number of read retries in the internal information log, the number of software errors recorded in the internal information log, the number of software errors recorded in the error information log, or the like.

It is possible to determine whether the failure mode is a write failure or a read failure by the magnitude relationship between the model output p and a predetermined threshold. For example, the failure mode is more likely to be a write failure as the model output p is closer to 1, and the failure mode is more likely to be a read failure as the model output p is closer to 0.

Figure 15:
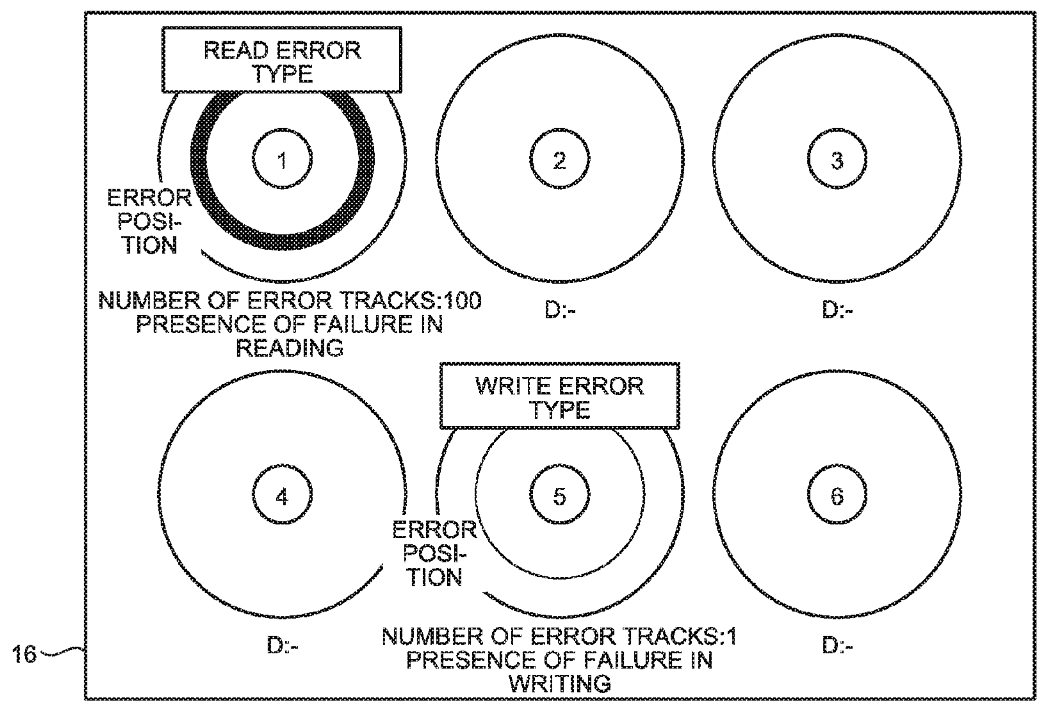
FIG. 15 is a diagram illustrating a display example of error positions detected by the failure predicting method according to the second embodiment.

FIG. 15 is a diagram illustrating a display example of error positions detected by the failure predicting method according to the second embodiment.

Referring to FIG. 15, a write failure and a read failure are predicted in the magnetic disc device HDD illustrated in FIG. 1. In this case, numbers (1) to (6) are given to the six disc surfaces of the magnetic disc device HDD, and the states of the disc surfaces are displayed on the display unit 16. The display unit 16 can display the presence or absence of a failure symptom (D:-means that there is no failure symptom), discrimination between a write failure and a read failure, the number of error tracks, the position of errors, and the like.

The case in which the failure predicting device 15 determines whether the failure mode is a write failure or a read failure may be applied to the configuration illustrated in FIG. 1 or may be applied to any of the configurations illustrated in FIGS. 7 to 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information memory device comprising:

a magnetic disc;

a magnetic head provided for the magnetic disc; and a prediction unit that predicts a failure mode related to errors on the magnetic disc based on physical position relationship between the errors, wherein the prediction unit predicts the failure mode based on a multivariate logistic regression model with the number of the errors and a parameter related to position information on the errors as explanatory variables.

2. The information memory device of claim 1, a magnetic disc;

a magnetic head provided for the magnetic disc; and a prediction unit that predicts a failure mode related to errors on the magnetic disc based on physical position relationship between the errors, wherein the physical position relationship between the errors is a physical distance between the errors, and the prediction unit predicts whether the failure mode is a disc failure or a head failure based on a parameter related to the physical distance between the errors.

3. The information memory device of claim 2, wherein the parameter related to the physical distance between the errors indicates locality or dispersibility of error distribution on the magnetic disc.

4. The information memory device of claim 2, wherein the physical distance is a two-dimensional spatial distance or a cylinder distance.

5. The information memory device of claim 2, wherein the prediction unit includes a maintenance unit that, in the case of the disc failure, disables writing into a predetermined range including sites where the errors have occurred, and in the case of the head failure, migrates data to a spare region.

6. The information memory device of claim 2, comprising a display unit that displays information including at least one of the physical position information on the errors and the parameter related to the physical distance between the errors.

7. The information memory device of claim 1, wherein the parameter related to the physical distance is given by a dispersive power D, and the dispersive power D is given by the following equation:

$$D=W/W_e$$

where $$W=\frac{1}{n}\sum_{i=1}^{n}d_i$$

$$W_e=\frac{1}{2\sqrt{n/S}}$$

S: Area of error distribution di: Distance from error i to closest adjacent error n: Number of errors.

8. The information memory device of claim 1, wherein the physical position relationship between the errors is radial magnitudes of the errors, and the prediction unit predicts whether the failure mode is a write failure or a read failure based on a parameter related to the magnitudes in the radial direction in which the errors exist.

9. The information memory device of claim 8, wherein the parameter related to the radial magnitudes of the errors is the total number of tracks with the errors, the maximum value of number of tracks with the continuous errors, or a standard deviation in the radial direction of the errors.

10. The information memory device of claim 8, wherein the prediction unit includes a maintenance unit that disables writing in the case of the write failure and migrates data to a spare region in the case of the read failure.

11. The information memory device of claim 8, comprising a display unit that displays information including at least one of the physical position information on the tracks with the errors and the total number of the tracks with the errors.

12. A failure predicting device comprising:

an acquisition unit that acquires physical position information on errors on a recording medium; and a determination unit that calculates physical position relationship between the errors on the recording medium based on the position information and determines a failure mode related to the errors based on the position information, wherein the physical position relationship between the errors is a physical distance between the errors, and the determination unit determines whether the failure mode is a medium failure or a head failure based on a parameter related to the physical distance between the errors.

13. The failure predicting device of claim 12, wherein the parameter related to the physical distance between the errors indicates locality or dispersibility of error distribution on the recording medium.

14. The failure predicting device of claim 12, wherein the physical position relationship between the errors is radial magnitudes of the errors, and the determination unit determines whether the failure mode is a write failure or a read failure based on a parameter related to the magnitudes in the radial direction in which the errors exist.

15. A failure predicting method comprising:

acquiring physical position information on errors on a recording medium; and calculating physical position relationship between the errors on the recording medium based on the position information and determining a failure mode related to the errors based on the position relationship, wherein the physical position relationship between the errors is a physical distance between the errors, and it is determined whether the failure mode is a medium failure or a head failure based on a parameter related to the physical distance between the errors.

16. The failure predicting method of claim 15, wherein the parameter related to the physical distance between the errors indicates locality or dispersibility of error distribution on the recording medium.

17. The failure predicting method of claim 15, wherein the physical position relationship between the errors is radial magnitudes of the errors, and it is determined whether the failure mode is a write failure or a read failure based on a parameter related to the magnitudes in the radial direction in which the errors exist.

* * * * *